United States Patent Office 3,327,631
Patented June 27, 1967

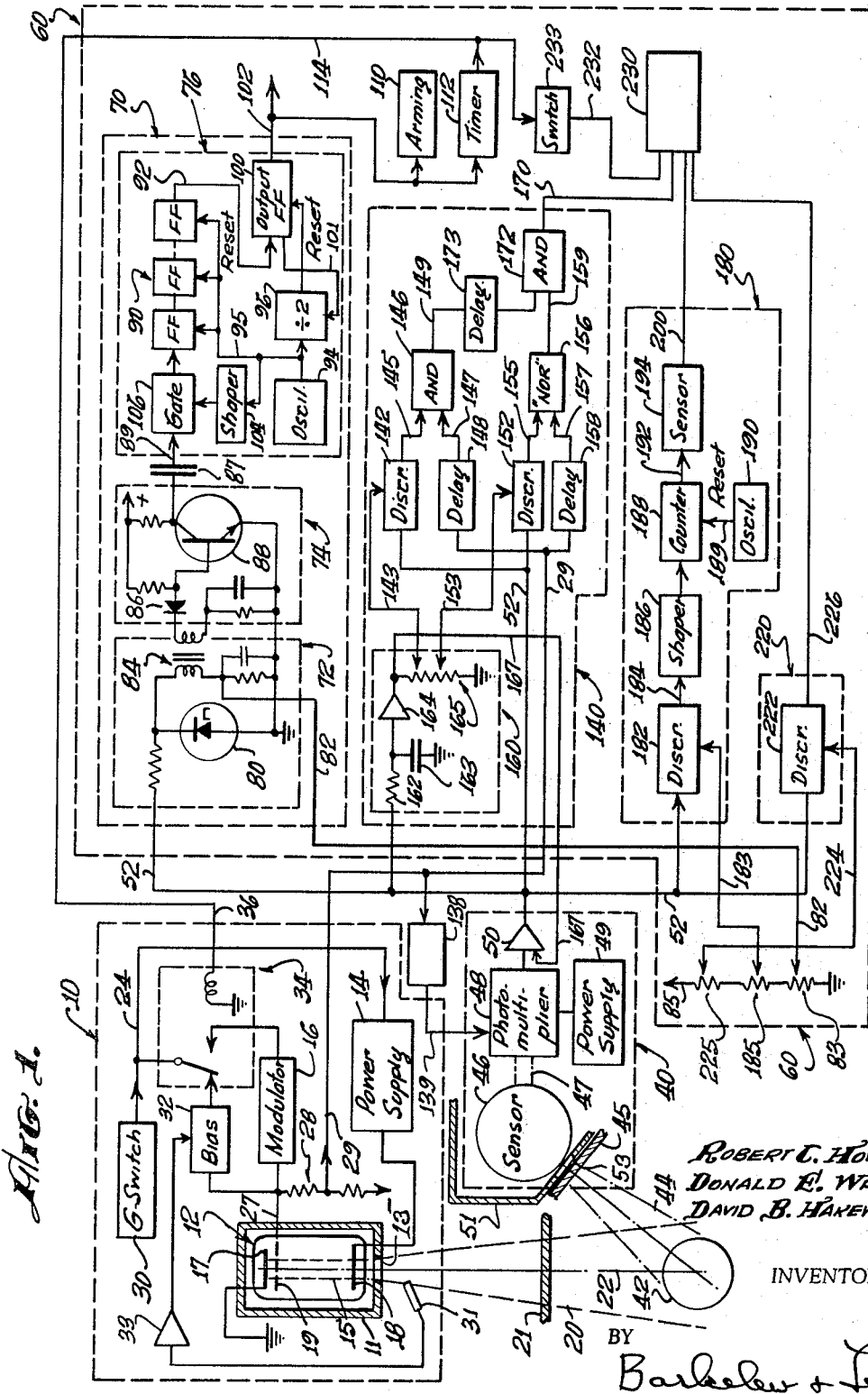

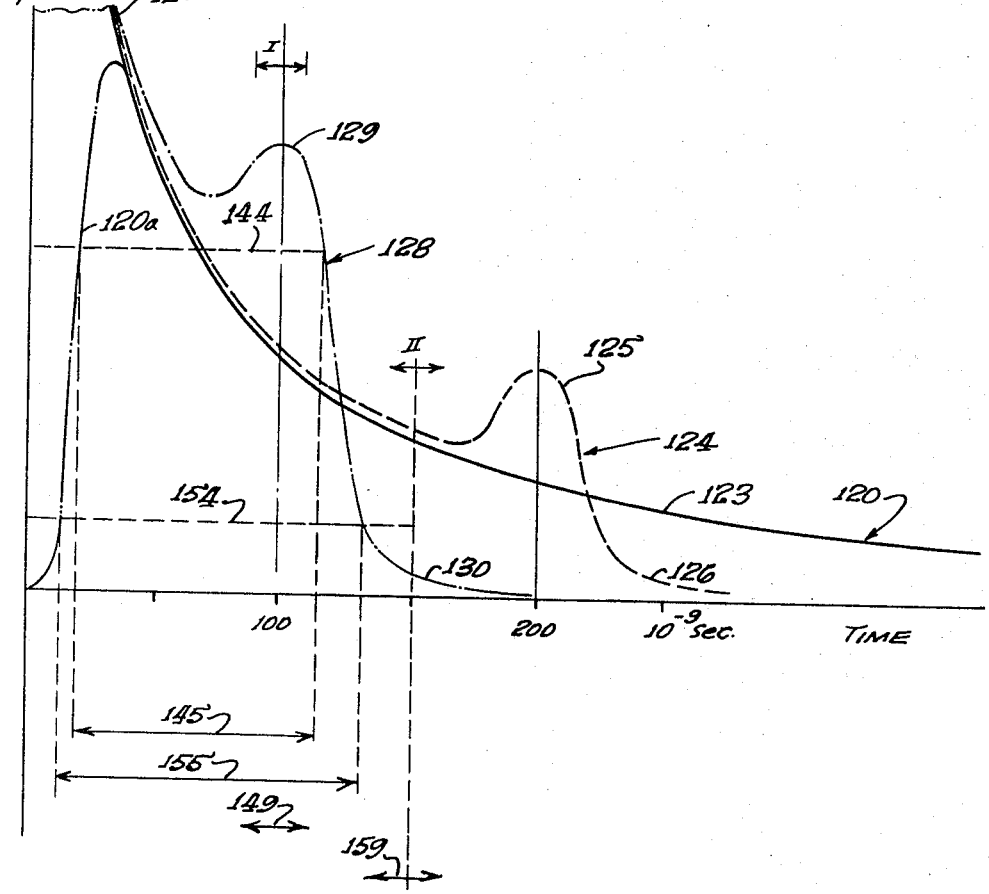

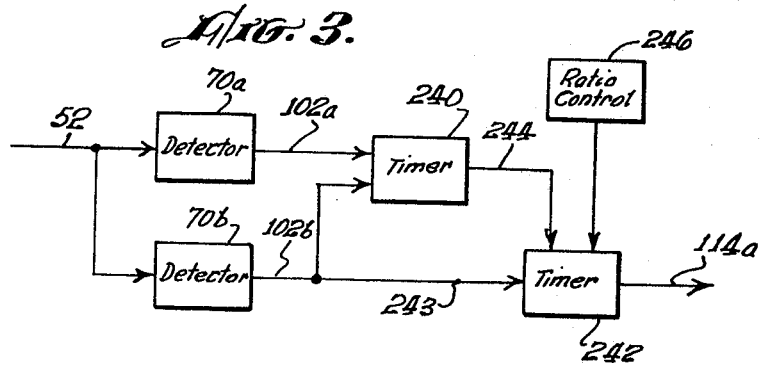
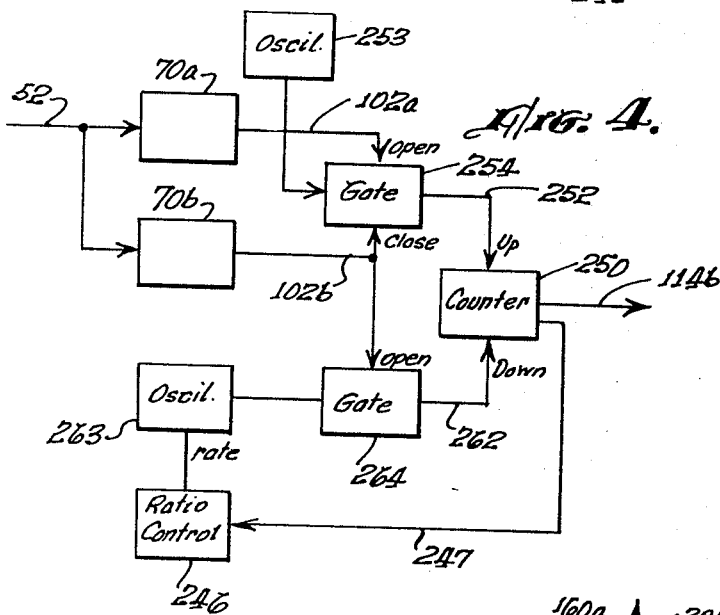
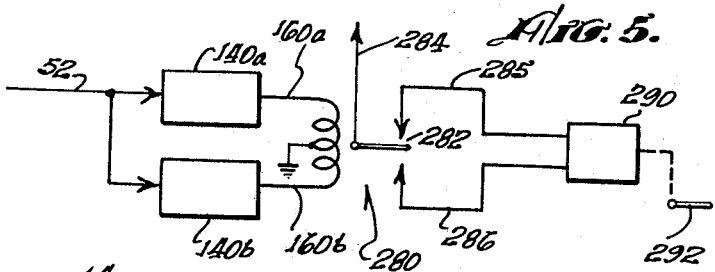
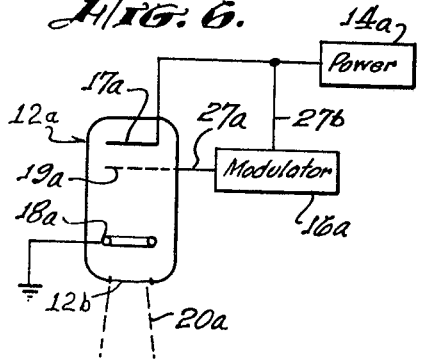
ROBERT C. HOWARD,
DONALD E. WRIGHT,
DAVID B. HAKEWESSELL,
INVENTORS.
BY
Barkelew & Lewis

3,327,631
FLIGHT VEHICLE POSITION SENSING SYSTEM
Robert C. Howard, Duarte, Donald E. Wright, Monrovia, and David B. Hakewessell, Altadena, Calif., assignors to Giannini Controls Corporation, Los Angeles, Calif., a corporation of New York
Filed Oct. 8, 1962, Ser. No. 230,028
28 Claims. (Cl. 102—70.2)

This invention has to do generally with sensing positional data, as for a rapidly moving vehicle.

The invention is particularly useful in connection with advanced re-entry vehicles, such as intercontinental ballistic missiles, for example. In such environments, the invention provides effective means for sensing such positional data as particular altitudes in the atmosphere and range to an object, which may be the earth's surface, for example. The signal from such sensing means may be utilized for control functions of any desired type.

The serious practical difficulties in sensing range data from a hypersonic vehicle by conventional methods are well known. The highly ionized shock wave surrounding an advanced re-entry vehicle, for example, absorbs radiation throughout the frequency range that would be useful for conventional radar ranging equipment. Electrostatic detection systems are similarly incapable of penetrating the ionized layer of the shock front. Moreover, the extreme structural and heating problems of actual re-entry of a hypersonic vehicle into the atmosphere generally restrict all sensing equipment to the interior of a properly protected vehicle shell.

The present invention overcomes those difficulties and provides many other important advantages by utilizing as the sensing medium penetrating radiation having relatively high energy per quantum unit. Such radiation may be of electromagnetic nature or may comprise discrete particles such as electrons or neutrons. However, the energy range of the electromagnetic radiation utilized by the invention is sufficiently high that its photon properties are the most important interaction mechanism, rather than reflection and refraction. For convenience of reference, those forms of radiation will be referred to collectively in the present application and claims as "penetrating radiation."

The invention may utilize penetrating radiation throughout a wide range of energies. For systems that require penetration of an atmosphere of appreciable density it is usually desirable to employ X-rays or electrons of 10 to 50 kev. or more, and energies up to the maximum that can practicably be generated are useful. For applications in which atmospheric penetration is not required, many advantages of the present invention can be obtained with lower energies. Particularly in the case of neutrons, the increased travel time of the particles with decreasing energy must be taken into account in detailed design of the equipment.

An important characteristic of such radiation is that its penetration through the atmosphere is significantly limited both by absorption and by scattering. The atmospheric scattering of the sensing radiation is utilized to provide positive information that is useful for navigation and for control purposes. For example, the magnitude of the backscatter from the atmosphere gives direct data on the atmospheric density, which may be utilized as a measure of altitude. Also, the backscatter of the sensing radiation from the atmosphere provides a signal base with respect to which the reflection from a relatively dense target object may be identified with increased reliability as will be more fully described.

The limited penetration through the atmosphere of the sensing radiation utilized by the invention provides the further important function, in the case of military applications, of relative immunity from enemy countermeasures. The radiation in question is impractical to produce in jamming intensities except by means of nuclear detonations. And even if produced in significant intensities, such radiation is ineffective against the penetrating radiation system in a military vehicle within the altitudes of interest unless produced in its immediate vicinity, that is, typically within a few hundred feet.

In accordance with one aspect of the invention, very short pulses of penetrating radiation, typically X-rays, are generated periodically in a directed beam. The time variation of the energy returned by scatter or reflection from the surroundings is detected and is compared to the backscatter that would normally result from the surrounding atmosphere. The resulting differential signals provide reliable information concerning objects in the radiation beam having a density that is large compared to that of the atmosphere. In particular, the time difference between the radiated pulse and the detected differential signal provides range information as to a target. To obtain such information as to a selected range value it is sufficient to detect the differential signal only at or close to the time corresponding to that range. A particular advantage of utilizing penetrating radiation of the described type, especially when used for determining altitude above the ground, for example, is that the reflected intensity depends less critically than many other types of radiation upon the detailed nature of the target surface.

At the same time, the invention provides a reliable criterion for distinguishing an extended surface, such as the ground, from small solid objects or assemblies which might be thrown up as a defense measure; and from other radiation sources, including nuclear weapons up to a predetermined yield. For that purpose the invention utilizes a distinctive characteristic "signature," or time course of the radiation reflected from an extended object. The signature is characterized by a sharp pulse reflected from the extended target; and by the relative absence of back-scatter from the atmosphere following receipt of that pulse. Discriminating circuitry is provided to distinguish that signature from the signature of an isolated object, wherein atmospheric backscatter continues to be received after the target pulse.

A further aspect of the invention provides circuit means that require a plurality of positive responses of the discriminating circuitry to initiate a final output signal, thereby greatly reducing the possibility of spurious output due to statistical variation or other factors.

Range information obtained in accordance with the invention may be employed for a wide variety of functions, including arming or fuzing of a warhead and navigation control. For example, elevators of a low-flying vehicle may be controlled in response to a ground range signal to maintain the vehicle at a predetermined altitude above the ground.

In accordance with a further aspect of the invention, the ranging system of the invention is protected, at least in large measure, against the possibility of being disabled by the very high flux densities that might result, for example, from a ground burst of a nuclear weapon shortly preceding arrival of the missile. The residual nuclear radiation from such an immediately preceding burst would be sensed by the detector of the system and would mask the relatively weak backscatter of the sensing radiation. The invention provides an alternate mode of operation, whereby detection of such a high critical level of radiation, typically by the regular system detector, produces an output signal that can be utilized in lieu of normal ground-ranging response. If that output signal is employed to fuze the warhead of the missile, for example, the result is then an effective air burst at the moderate height at which the critical radiation level is encountered.

The mode of operation just described is preferably prevented from responding to a relatively brief burst of nuclear radiation, such as might result, for example, during detonation of a defensive nuclear warhead close to the missile. Such immunity can be obtained, for example, in accordance with a further aspect of the invention, by requiring that the described critical level of radiation be maintained for a time period long compared to such a burst. For example, the detector output is integrated over a time period that is long compared to an air burst, and an output signal developed only if the integral exceeds a set threshold. By limiting the effective signal amplitude supplied to the integrator, the contribution from even a very intense short burst can be kept low.

Another aspect of the invention provides a further mode of operation for detecting an extremely intense level of radiation which if continued would destroy the warhead without detonation. Such a lethal level of radiation is typically sensed by the regular detector, tripping a rapid circuit and delivering a fuzing signal immediately. Detonation is thereby obtained before the vehicle or warhead is destroyed by the counterblast, producing at least some weapon effects on the defender, such as high altitude blackout effects on the defender's communication and radar systems.

A further aspect of the invention provides direct and accurate sensing of the atmospheric density surrounding the vehicle. That may be accomplished, for example, by operating an X-ray tube or other radiation source continuously at a definite, relatively low energy level, and measuring the total backscatter from the atmosphere. With correct calibration of the equipment, to allow for scatter from the vehicle walls, for example, the resulting signal gives a direct measure of atmospheric density. A particular advantage of utilizing penetrating radiation such as X-rays for this purpose is that the signal corresponds predominantly to the air density at such radius from the missile that the measurement corresponds closely to the vehicle position, but that local perturbations, such as the vehicle shock wave, do not contribute any serious error to the measurement. In preferred form of the invention, such density sensing may be accomplished, typically on a shared-time or programmed basis, by essentially the same equipment as the ranging and other functions previously described.

A further aspect of the invention utilizes atmospheric density measurements to control the action of the ranging or other functions of the system. For example, the warhead may be armed and the ranging mode of system operation initiated in response to a selected air density. For such purposes it is preferred to utilize as critical density one of the isopycnic layers of the atmosphere, such as those at 0.155 and 0.038 kg./m.$^3$ (approximately 25,000 and 83,000 feet altitude), respectively, described in ASTIA Document No. AD–160755, Behavior of Atmospheric Density Profiles, December 1958. The atmospheric densities at those altitudes are constant within approximately 1% irrespective of latitude, longitude and season. Hence, they provide a reliable and remarkably accurate datum.

More particularly, the data sensing system of the invention is typically put into operation in its atmospheric density sensing mode of operation in response to the vehicle deceleration that accompanies re-entry. Detection of a definite atmospheric density is then utilized to initiate the pulsed mode of operation of the described ranging equipment, either immediately or after a set time delay. That sequence has several advantages over complete reliance upon deceleration signals for arming. In addition to its greater intrinsic altitude accuracy, the lower isopycnic datum level is below the region of maximum trajectory variability for a re-entry vehicle. It is also below the level at which a countermeasure air burst can safely be produced by the enemy. Moreover, it is relatively close to the normally desired actual fuzing point.

In accordance with a further aspect of the invention, an air burst can be produced at a desired altitude. For that purpose, detection of a selected critical atmospheric density, as by means of the described X-ray backscatter measurement, may be utilized as a base altitude for direct production of a fuzing signal, either immediately or at a selected lower altitude. A desired altitude difference may be computed, for example, in terms of an appropriate time delay which takes account of the known vehicle velocity and path inclination. If desired, the vertical component of the vehicle velocity may be computed directly from the time difference at the two isopycnic layers.

The invention further provides electronic circuits that are particularly effective and economical of space and weight for performing certain functions in connection with the described sensing and control systems.

An important advantage of the invention is its ability to function effectively for navigation, warhead fuzing and other purposes in the face of extremely severe counter-measure activity, both electronic and nuclear. That ability results in large measure from the limited range of the so-called penetrating radiation in the atmosphere. Although that also limits typically to a few hundred feet, the target range that can be detected, it renders the system immune to even very intense sources of counter-radiation unless they are correspondingly close. In addition, the pulsed nature of the source and the unique target signature provide counter-measure immunity.

A full understanding of the invention, and of its further objects and advantages, will be had from the following description of certain illustrative manners of carrying it out. The particulars of that description, and of the accompanying drawings which form part of it, are intended only as illustration and not as a limitation upon the scope of the invention, which is defined in the appended claims.

In the drawings:

FIG. 1 is a schematic drawing representing, largely in block form, an illustrative embodiment of the invention;

FIG. 2 is a schematic diagram representing typical time relationships of certain signals in connection with the invention;

FIG. 3 is a fragmentary schematic diagram representing a modification for facilitating altitude detection;

FIG. 4 is a fragmentary schematic diagram representing a modification of FIG. 3;

FIG. 5 is a fragmentary schematic diagram representing a further modification for range control; and FIG. 6 is a fragmentary schematic diagram representing a modified radiation source.

For clarity of explanation the invention will be described primarily as it pertains specifically to the use of X-rays as sensing medium; but it is to be kept in mind that electrons of comparable energy or neutrons may be employed instead, and that some aspects of the invention can be carried out with penetrating radiation derived in known manner from natural or artificial radioactive sources.

The illustrative embodiment of the invention shown schematically in FIG. 1 comprises the X-ray source subsystem 10, the detector subsystem 40 and the decision subsystem 60. The source subsystem comprises an X-ray tube 12, which is of a type that can be modulated to produce short pulses of X-rays, a high voltage anode power supply 14 for the tube, and a modulator 16 for pulsing the tube at an appropriate pulse length and repetition rate.

Tube 12 is typically a triode tube with grounded cathode 17, positive anode 18 maintained at high potential by power supply 14, and control grid 19, variably controlled via the line 27. If preferred, the grid may be grounded, and cathode 17 driven by line 27, the polarity of the control voltage then being reversed. Cathode 17 provides a source of electrons and may comprise, for example, a thermal emission element that is heated directly or indirectly, or a field emission surface. Grid 19 is typically a metallic mesh structure. Anode 18 may comprise a conventional target of tungsten or other suitable material. With negative voltage on grid 19 the electrons are effectively stopped. When the grid is driven into conduction at suitable positive voltage, a stream of electrons 15 is accelerated to the anode target. These electrons interact with the target material to produce X-rays of energy characteristic of the material and the applied voltage. For the present purposes a wide variety of X-ray energies may be used. The energy range approximating 50 to 200 kev. average energy is ordinarily particularly effective for systems intended to operate within the atmosphere.

By employing in known manner suitable anode structure supplemented by shielding 11 suitably apertured as indicated at 13, the X-rays produced by tube 12 are preferably substantially limited to a well-defined beam, as indicated schematically at 20. Beam 20 may, for example, occupy a full cone angle of approximately 20°. The beam axis 22 may be oriented in any desired direction, which takes account of the particular ranging operation to be accomplished. Beam 20 extends typically from source 12 within the vehicle through some part of the vehicle wall, represented schematically at 21, to the exterior. Whereas it is ordinarily desirable that wall section 21 include as little mass as possible to minimize loss by scattering and reflection, an important advantage of the invention is that it is not necessary to provide a "window" of any particular type of material for passage of beam 20. That is especially convenient for maintaining full re-entry capability of a missile.

Modulator 16 typically comprises a pulse train generator operating at the desired pulse frequency; and shaping and amplifying means for developing on the line 27 control pulses of suitable form for modulating tube 12. Modulator 16 may be of known type, but is preferably designed, together with tube 12, to produce very short pulses of X-rays. Whereas longer pulses are useful for many purposes, it is usually desirable to limit the pulse length in short range applications to the approximate range from $10^{-7}$ to $10^{-8}$ second, or even less. The pulse frequency is not critical, $10^4$ pulses per second being illustrative. At that pulse rate, a typical re-entry vehicle travels on the order of one foot between pulses. Timing pulses for synchronizing other parts of the system are typically derived from line 27 with suitable attenuation, as by the voltage divider 28, and are supplied via the line 29.

Power supply 14 may be of known type. It is preferably controllable via the line 24 to initiate tube operation in response to a control signal which is developed in any desired manner. For use on a re-entry vehicle, such a signal may be developed by a G-switch 30, which is responsive to the deceleration of the vehicle that occurs during re-entry. Switch 30 may, for example, be of a known type which opens line 24 during the initial phases of the vehicle flight, but supplies an actuating signal to line 24 on re-entry and maintains it thereafter. That signal typically causes voltage supply 14 to apply full anode potential to X-ray tube 12, thereby preparing it for operation under control of grid 19.

The actuating signal on line 24 may also be supplied directly to modulator 16 to initiate pulsed operation of the X-ray tube. However, as an illustration of the flexibility of operation of the system of the present invention, the present embodiment does not immediately initiate pulsed tube operation. Instead the G-switch signal on line 24 is first directed to the command switching device 34, which is shown illustratively as a conventional relay. In idle condition of the relay, the signal on line 24 is supplied to the bias circuit 32. Bias circuit 32, which may be structurally integrated, at least in part, with modulator 16, responds to that control signal by driving tube grid 19 to a potential less negative than cut-off, at which continuous conduction occurs at a power level that is relatively low compared to the high intensity pulse operation previously described. That low level continuous operation is continued until a control signal is supplied via the line 36 to switching device 34. Such control signal is typically produced, as will be more fully described, in response to detection by the present system of a predetermined atmospheric density. Relay 34 then deletes the actuating signal from bias circuit 32 and directs it instead to modulator 16, initiating pulsed operation of X-ray tube 12. Additional switching operations required by the system for that change of operating mode may be performed by relay 34 through additional relay switches, not explicitly shown. That specific control action is illustrative of the wide variety of system operations that may be provided.

Self-calibration is preferably provided for the X-ray tube operation. For example, during continuous operation phase of X-ray tube 12, the output intensity is monitored by an auxiliary detector, indicated schematically at 31, which is of any suitable type, preferably having good stability of response. The output from detector 31 is amplified at 33 and the resulting signal is supplied as control signal to bias circuit 32 in such a way as to make the bias on line 27 more negative with increasing control signal. The output intensity from tube 12 is thereby maintained at a stable level. Similar stabilizing control may be provided if desired during the pulsed mode of tube operation, for example by using the signal from amplifier 33 during one pulse for controlling the grid or anode voltage of tube 12 at the next pulse.

Detector subsystem 40 comprises sensing means 46 of any suitable type responsive to X-rays from beam 20 that are scattered or reflected by matter outside of the vehicle. The energy scattered and reflected by such matter is partly directed toward sensor 46, and may be considered to comprise a reflected beam 44. It will be understood, however, that such a beam is highly idealized, since X-rays of the energies typically employed in the invention tend to be scattered substantially isotropically. Moreover, as will be more fully explained, a significant amount of scattering of beam 20 is produced by the atmosphere as well as by any objects of greater density. Nevertheless, for any particular search beam 20 and distribution of matter, a definite intensity of X-ray energy 44 will reach detector 46. Moreover, that reflected energy can be transmitted with acceptable loss through a wall portion of the vehicle, as indicated schematically at 45. Wall portions 21 and 45 are preferably, though not necessarily, mutually spaced. Such spacing ordinarily reduces the energy that is scattered directly from wall portion 21 to detector 46. That scattering may be further reduced by suitably designed shielding of the detector from the radiation source, as indicated schematically at 51. That shielding, typically of high density material, may be apertured as at 53 to define the effective input beam 44 to the detector. The geometry of beams 20 and 44 define a region from which the detected energy is primarily derived. That region is indicated purely schematically at 42. In actual practice, a certain amount of radiation will normally reach the detector directly from source 12 and scattered from various parts of the structure. However, such spurious radiation can be compensated by suitable bias or zero adjustment of the detector; and is ineffective when the time selection techniques to be described are employed.

A preferred type of sensor 46 comprises a body of solid light-transmitting material that scintillates strongly when irradiated by X-rays. Many plastic materials are known to have that property, of which terphenyl dissolved in polystyrene is illustrative. The light produced by such scintillation, indicated at 47, is detected photoelectrically, preferably by a photomultiplier tube 48 which may be of known type. A separate high voltage power supply for photomultiplier 48 is indicated at 49. The detailed design of scintillator 46 and photomultiplier 48 is preferably such as to maintain the fast response time of which such devices are capable. That response time is preferably of the same order as the pulse duration of the X-ray pulses in search beam 20. A useful feature of a photomultiplier is the wide range of signal intensity over which its output is substantially linear. However, a linear output is not essential for satisfactory operation of many aspects of the invention.

The output from photomultiplier 48 is typically amplified by an amplifier 50 and supplied as a voltage signal to the line 52. Amplifier 50 may be of known type but is preferably designed to provide very rapid response together with substantially linear output over the wide amplitude range of the signal from 48. Amplifier 50 typically includes the usual stabilizing means, and its gain may be made automatically variable in known manner in response to an input control signal on the line 167, to be described, in order to compensate for variations in other parts of the system.

Decision subsystem 60 in the present illustrative embodiment comprises four distinct but interrelated channels, each of which is adapted to produce an output signal under definite respective sets of conditions. Whereas such signals may be employed for any desired purpose, typical control functions for which they are well adapted will be described. These channels comprise the atmospheric density computer 70; the ranging computer 140; the toxic level detector 180; and the lethal level detector 220. Each of those decision subsystems is shown as receiving an input signal from detector subsystem 44 via the common line 52. However, it will be understood that amplifier 50 may be provided with separate electrically isolated outputs for driving the individual decision circuits to be described; or entirely separate amplifying or even detection channels may be provided, as desired.

Atmospheric density computer 70 typically responds to continuous operation of X-ray tube 12, effectively counting the individual photons that reach detector 40 within a predetermined time period with an energy exceeding a definite threshold value. That counting is preferably performed digitally. If the count within the set time period exceeds a selected value a signal is developed. In preferred form of the circuit, such a signal must be obtained in more than one consecutive timing period in order to develop an output control signal, thereby reducing the possibility of spurious response.

As illustrated, computer 70 comprises the discriminator circuit 72, the pulse shaper 74, and the integrating logic block 76. Discriminator 72 typically comprises a tunnel diode 80 connected in shunt to the input from line 52. The resistance of the diode is normally relatively low, shunting input signals of low amplitude to ground. When the magnitude of an input pulse exceeds the threshold set by the voltage supplied via the line 82, the tunnel diode switches rapidly from low to high resistance. The resulting rapid change in the current flowing through the primary of pulse transformer 84 produces a sharp pulse in the transformer secondary. That pulse is amplified by circuitry 74, shown illustratively as comprising the transistor 88. Diode 86 prevents a reverse current swing which might cause a spurious doubling of the pulse. The amplified pulse is supplied via coupling capacitor 87 to the line 89. The reference voltage on line 82 may be supplied in any suitable manner, as by the potentiometer 83 which is connected in series with the potentiometers 185 and 225 to a suitable power source 85. That reference voltage corresponds in value to the desired threshold of photon energy. An illustrative value for that energy threshold is about 25 kev., which is typically low enough to give a satisfactory counting rate with tube 12 operated at an average X-ray energy of 50 kev., for example; and high enough to eliminate many background counts.

Integrating logic block 76 typically comprises a string of N dividers 90, typically flip-flops of known type, which are so coupled as to yield an output pulse on the line 92 for every $2^N$ input pulses. N may typically be approximately 10. The pulses on line 92 are supplied as input to the output flip-flop circuit 100, which acts as a divider, normally producing an output pulse on the line 102 in response to shifting from state 1 to state 0, say. An oscillator 94 produces reset pulses on the line 95 at a selected frequency such as 10 kc., for example. Those pulses periodically reset the dividers 90, and also drive the scale-of-two divider 96. The output pulses from 96 reset output divider 100 to its state 0, suitable means being provided to prevent an output on line 102 when the divider is thus reset. A circuit, of known type, indicated at the line 101, derives a signal from divider 100 whenever the latter is in state 0. That signal is applied to divider 96 in such a way as to bias it to state 0. Hence divider 96 is effectively disabled except while output divider 100 is in state 1.

When the input pulse rate on line 89 is sufficiently high so that an output pulse is obtained at 92 from the divider string 90 before reset, output flip-flop 100 is triggered. If, in the next counting period the count again exceeds $2^N$, the output flip-flop delivers an output signal on the line 102. On the other hand, if a lower number of counts is recorded during that second period, output flip-flop 100 is reset via divider 96. Hence the count during a single timing period, which may be abnormally large due to some spurious effect, cannot by itself produce an output at 102. It is unlikely that a spurious effect, such, for example, as a nuclear disturbance, will greatly influence two successive timing periods.

That possibility can be greatly reduced by disabling the counter for a short time between successive timing periods, thus effectively separating them in time. For example, the reset pulses from line 95 may be supplied to a shaping circuit, indicated schematically at 104, which may be of known type and lengthens each pulse to a selected value, such as 10 microseconds. The resulting pulses may then be supplied to a gate 106 connected in the input line to divider chain 90. Gate 106 may be of known type, arranged to isolate divider chain 90 from input line 89 during each control pulse from 104, thereby disabling the count for a predetermined interval between successive counting periods. A spurious source of counts then cannot affect two successive counting periods unless it continues longer than the selected disabled interval.

With the described illustrative circuitry in computer 70, appearance of an output signal at 102 typically represents a definite intensity of X-rays reflected by the matter in the region 42 outside the vehicle. With suitable selection of the pulse threshold level at 82, the critical count rate at 76, and other factors, that intensity may be made to correspond to a selected atmospheric density. With suitable selection of such factors as the separation of source 12 from detector 40 and the geometry of beams 22 and 44, the region 42 to which the system responds effectively can be limited to a distance from the vehicle sufficiently great that local disturbances such as the density differences associated with the vehicle shock wave contribute only negligibly to the result. The method therefore is capable of distinguishing accurately the true ambient atmospheric density.

An important advantage of the present aspect of the invention as described above is its utilization of an X-ray tube operating continuously at moderate power level as a source for atmospheric density measurement. The same tube may then be made available on a shared time basis for operation in another mode, as will be typically described. It will be recognized, however, that many advantages of the present invention may be obtained with alternative density measuring devices, which may be of known type. In particular, a continuous gamma ray or neutron source of known type may be employed in place of source subsystem 10, the atmospheric backscatter being sensed and discriminated typically in the manner already described. The intensity of the continuous radiation from such a source is typically so low as to be negligible during operation of the X-ray tube in its pulsed mode. That is, each pulse, though very brief, is typically more intense by several orders of magnitude than any practical continuous source.

Alternatively, X-ray tube 12 may be operated in its pulsed mode for atmospheric density measurments, as well as for other types of control to be described. That has the advantage that the detector can be made responsive only to the backscatter from matter at a selected range, for example at a range exceeding a selected threshold. Illustrative circuitry 138 for that purpose will be described. The resulting density value then represents the true ambient density independently of any local disturbances at ranges closer than the threshold.

In one form of the invention, computer 70 is designed and adjusted to give an output signal on line 102 when the density exceeds the value corresponding to one of the recognized isopycnic layers of the atmosphere, already referred to. A remarkably stable, accurate and reliable reference altitude is thereby made available. The signal at that reference altitude may be utilized in any desired manner. In particular, it may be supplied as input control to an arming device, indicated schematically at 110, which promptly arms the missile warhead. Also, the signal may be utilized to start a timing mechanism 112 which produces a control signal on the line 114 after a time delay, the value of which may be fixed, or may be variable either by manual adjustment or by automatic control. Time delay mechanisms of that type are well known. In the case of a re-entry missile, the vertical components of the velocity following re-entry is ordinarily known with good accuracy, so that the time delay introduced by timer 112 represents a predetermined altitude difference from the isopycnic layer detected by computer 70. Hence, the signal on line 114 may be arranged to represent any desired altitude beyond that layer.

That altitude signal may be utilized in any desired manner. It may, for example be supplied to input line 36 of X-ray source subsystem 10 for operation of control switch 34. X-ray tube 12 is thereby switched from continuous mode of operation, which was adapted for density detector 70, to intermittent operation, adapted for ranging. Arming device 110 may, if desired, be controlled by a delayed signal such as 114. Moreover, a delayed signal such as 114 may, for example, be supplied either directly or subject to additional control, to a fuzing device for producing an air burst at a predetermined altitude. Such a device is indicated schematically at 230 with input connection via the line 232 from line 114. A selection switch in series with line 232 is indicated at 233.

With X-ray tube 12 operating in its pulsed mode, typically at full power, the output signal on line 52 from detector subsystem 40 is correspondingly periodic. FIG. 2 represents in graphical form the time course of that signal under certain illustrative conditions, plotted as a function of time following each X-ray pulse initiation. Curve 120 illustrates the signal in presence of appreciable ambient atmospheric density. The detector receives almost instantaneously appreciable energy transmitted through and around the shielding, followed by a large backscatter from the air immediately surrounding the vehicle, as indicated at 121. As the initial pulse travels away from the vehicle, the level of the atmospheric backscatter rapidly decays from its peak value. However, a relatively long tail 123 is still present, which decreases asymptotically toward zero due primarily to the combined action of the inverse square law of energy propagation and beam attenuation due to atmospheric scattering and absorption. That attenuation of both outgoing and returning radiation depends in known manner upon the atmospheric density and the photon energy. For example, a beam of 50 kev. X-rays at sea level decays to half its initial energy after penetrating approximately 100 feet.

Sensing system 40 is preferably rendered unresponsive to radiation received by sensor 46 during a short time interval following each pulse. That protects the system from overloading by X-rays reflected from matter at close range, such as wall 21 and the atmosphere close to the vehicle. The dead region thus produced typically extends beyond the vehicle shock wave, so that the detector response is not affected by density variations within the shock wave. For detecting a target at a definite minimum range, the blanking interval may represent the two-way X-ray travel time for a distance somewhat less than that range. Such blanking may be accomplished in many ways. For example, the timing pulse from line 29 may be stretched to the desired length by circuitry of known type indicated at 138, and then applied via the line 139 to photomultiplier 48 in a manner to disable the bias on the first dynode of that tube for the selected time interval. The photomultiplier is thereby made responsive only to X-rays scattered from matter beyond the radius corresponding to that interval. Such gating of the detection system typically modifies the signal 52 as indicated in FIG. 2 at 120a. Similar or identical time gating of the response of detector subsystem 40 is preferably provided when the X-ray tube is employed in its pulsed mode for other navigational purposes, such as measuring atmospheric density, for example, as already indicated.

The curve 124 in FIG. 2 represents an illustrative time course of signal 52 when the detector is approximately 100 feet above ground zero, that is, above the point on the ground surface directly below the vehicle. The curve is drawn for a slightly greater atmospheric density than curve 120 for clarity of illustration. Two unique characteristics are apparent in that target signature. First, the initial backscatter is substantially unchanged, but at a time at approximately $200 \times 10^{-9}$ seconds from pulse initiation the X-ray backscatter from the target superimposes a dominant amplitude increase on the normal air backscatter, forming a peak 125.

The second unique characteristic of target signature 124 is the effective null at 126 following the target backscatter pulse 125. That null results from the relatively high density of matter below ground zero, which rapidly attenuates the beam essentially to zero. The corresponding target signature curve for altitude of approximately 50 feet above ground zero is represented schematically at 128. That curve shows similarly the ground return peak at 129, at a time corresponding to the target range; and the relative null 130 which follows that peak.

In accordance with one aspect of the present invention, presence of an extended target such as the ground can be detected and its range determined by observing either the direct target backscatter as a peak of signal intensity above the normal atmospheric backscatter, or by observing the following signal null as a decrease of intensity below the normal atmospheric backscatter. In preferred form of the invention ranging circuitry is designed to inspect for both those described characteristics of the target signature. The ranging system is thereby made relatively immune to spurious actuation due to any cause that produces either an abnormally high or an abnormally low output signal.

An illustrative range detection subsystem in accordance with the invention is represented in block form at 140 in FIG. 1. The output signal on line 52 from detector subsystem 40 is supplied to two independent discriminating circuits 142 and 152 which also receive reference signals via the respective lines 143 and 153. Those reference signals may be developed in any desired manner, and may, for example, have fixed values. However, it is ordinarily preferred that the reference signals be developed in such a way as to reflect gradually any variations in operating conditions of the system. That may be done typically by integrating the signal on line 52 with a suitable time constant that is relatively long compared to the period between X-ray pulses, and developing reference signals proportional to the integral. The illustrative reference signal source represented at 160 comprises the resistance 162 and capacitance 163 connected in an integrating circuit; the amplifier 164; and the scaling circuit 165, represented as a voltage divider, for producing a plurality of output signals having a predetermined mutual ratio. Output signals are tapped on the lines 143 and 153 from suitable respective points of scaler 165, which points may be variable as shown, or may be fixed, to supply reference signals of desired relative amplitude to discriminators 142 and 152. Any variation in the average signal level on line 52 then causes a corresponding variation in both reference signals. For example, if the atmospheric density varies, those reference signals then vary essentially in the same proportion. Also, if the X-ray intensity emitted from tube 12 should vary, or the response of detector 40, such changes are also reflected in the reference signals. The reference signals thus perform an internal calibration function, compensating automatically for drift variations of the equipment.

The integral signal from amplifier 164 may also be employed as a control signal to stabilize operation of the system. Such control may act, for example, to modify the output of tube 12 or the gain of amplifier 50 or of photomultiplier tube 48, or to otherwise alter the system to stabilize any long-term variations in the average signal on line 52. As illustrated, the integral signal is supplied via line 167 as a control signal to vary the gain of amplifier 50 in a direction to stabilize the signal. In the present system, that action supplements the stability obtained by the described derivation of reference signals 143 and 153.

By suitable design and adjustment of source 160, the reference signals are typically set at respective levels that have a desired relation to the normal atmospheric back-scatter intensity, curve 120 of FIG. 2. For detection of a target at the illustrative range of 50 feet, corresponding to time Region I, first reference signal 144 is typically set at a selected value greater than the normal signal on line 52 at that time and less than the signal peak 129 expected from a target at that range. An illustrative intermediate reference signal half way between those two levels is indicated at 144 in FIG. 2. The second reference signal 154 is typically set at a value considerably less than the normal signal on line 52 for time Region II, for example one half of that normal signal as indicated at 154 in FIG. 2.

It is to be noted that when the detector is disabled for a set time period following each emitted radiation pulse, as via circuit 138, any variation in that time period affects the time integral of the detector output. It is therefore desirable to maintain the disabled time strictly uniform, which may be done by careful design and construction of timing circuit 138. It is also desirable to make the disabled time as long as is practicable for the target range to be sensed.

Discriminators 142 and 152 are typically differential amplifiers of known type which produce output voltages on their respective output lines 145 and 155 whenever the inputs from line 52 exceed the respective reference voltages 143 and 153 by some definite threshold. Assuming that threshold to be zero for clarity of description, the output signals on lines 145 and 155 then appear, in presence of a target at range 50 feet. during the times so indicated in the lower part of FIG. 2.

Range detection subsystem 140 includes means for sampling those signals at times corresponding to Regions I and II, respectively; and for producing a ranging signal on the line 170 in joint response to presence of signal 145 and absence of signal 155 at the respective sampling times. Illustrative logic circuitry for performing those functions includes the AND gate indicated schematically at 146, which receives as one input the signal on line 145, and as the other input a timing pulse from the line 147. That timing pulse is typically derived from the trigger pulse on line 29 from modulator 16, delayed by a time interval equal to the two-way travel time to a target at the desired range. That delay, typically 100 nanoseconds for a range of 50 feet, indicated as time Region I, is produced by the delay circuit 148, which may be of known type. The output from AND gate 146 in absence of a target at substantially the desired range is zero. In presence of such a target the output is a pulse at the time indicated schematically at 149 in FIG. 2.

A second gate is indicated at 156, receiving as inputs the signal on line 155 and the trigger pulse from line 29 delayed by circuit 158 for a time corresponding to Region II. Gate 156 produces an output on the line 159 only in presence of an input on line 157 and in absence of an input on line 155. Such a gate is known as a Positioned Exclusively OR gate, but will be referred to for convenience as a "NOR" gate. The output in absence of a target is zero. In presence of a target at the desired range, with signature 128, the output is a pulse on line 159 at the time indicated in FIG. 2.

A further AND gate 172 receives as inputs the output signals from AND gate 146 and "NOR" gate 156, suitable compensation being provided for the normal time difference of those output signals. For example, a time relay circuit 173, corresponding to that time difference, may be inserted in line 149. AND gate 172 then produces an output pulse on line 170 if, and only if, both of the described criteria corresponding to Regions I and II of the target signature are satisfied. The output pulse may be employed for any desired function, such, for example, as navigational control or for fuzing a warhead.

The fact that those two criteria are opposite in sense with respect to the detected signal makes the overall ranging system virtually immune to premature response to abnormal conditions such as might result from statistical variations of from enemy counteractions.

A further aspect of the present system may typically be employed to protect against loss of the warhead in case the missile encounters intense ground radiation, such as might result from ground contamination from a prior warhead detonation. Such radiation can be sufficiently intense over a small area to prevent reliable operation of the described ranging subsystem for practical values of the X-ray beam intensity and photon energy.

The system illustrated includes the ground radiation detecting subsystem 180, which represents illustrative means for detecting excessive levels of high energy gamma radiation that continue for a predetermined time interval. The subsystem as illustrated operates on a digital basis, detecting and counting individual photons. That is made possible, at the high intensity levels to be sensed, by limiting the response to photons of energy far higher than that of the X-rays developed by tube 12, for example. However, in preferred form of the present aspect of the invention those high energy photons are detected by the same detection subsystem 40 employed for sensing the X-ray back-scatter.

The output signal on line 52 from that detection subsystem is typically supplied to a discriminating circuit, indicated schematically at 182. That circuit also receives from the line 183 a reference signal which may be produced in any suitable manner and which is typically set at potentiometer 185 to correspond to a selected photon energy threshold. Circuit 182, which may be of known type, produces output pulses on the line 184 only in response to peaks of the input signal from line 52 that exceed the threshold set by line 183. That threshold is typically set at a value well above the photon energy from source 12, and such that pulses exceeding the threshold are received at a convenient counting rate from radiation of the type and intensity anticipated close to a preceding ground burst. Such pulses on line 184 are shaped, and may be further amplified, by circuitry indicated at 186.

Such shaping may, if desired, include stretching of the pulses to a predetermined length.

The selected and shaped pulses are integrated, as by conventional counting circuitry 188 which includes reset means by which the count may be reset to zero in response to a signal from the line 189. Such reset signals are supplied periodically at a selected period by means indicated at 190 and typically comprising an oscillator. Whenever counter 188 overflows, or reaches an otherwise defined count, during the interval between reset pulses, an output signal appears on the line 192. That signal may be employed directly as output from the subsystem, or it may be further discriminated, as by the level sensing circuitry 194. Such circuitry may, for example, produce a final output on the line 200 only in response to receipt of signals from line 192 at a rate exceeding a set threshold value. That threshold is ordinarily selected to represent ambient radiation intensity high enough to threaten disablement of ranging subsystem 140. Although digital operation of subsystem 180 is ordinarily preferred, it will be understood that corresponding functions can also be carried out in analog form, leading to an output signal in response to radiation intensity at a selected level.

The period of reset pulses on the line 189 is typically made to exceed the duration of the immediate radiation from a nuclear burst by a considerable factor, such as 100, for example; and the integrating or counting rate is limited in any suitable manner so that, regardless of the peak intensity from such a burst, the output threshold cannot be attained during a single burst. Such limitation may be provided in the descirbed digital circuits by controlling the length of the pulses from shaper 186 so that they run together above a selected repetition rate. In analog circuitry conventional amplitude limitation may be provided at the input to the integrator.

The output signal at 200 may be employed for any desired purpose. Ordinarily it is used to replace or supplement the ranging subsystem output on line 170.

FIG. 1 further illustrates at 220 means for avoiding complete loss of a warhead due to presence of ambient radiation in such intensity as would promptly destroy the vehicle or warhead. Such defense against lethal radiation typically comprises a discriminating circuit 222, which compares the signal on line 52 with a reference signal supplied via the line 224. That reference signal may be produced in any suitable manner as by the potentiometer 225. It typically corresponds to the output from detector subsystem 40 in presence of radiation intensity so high that it would cause serious damage to the system within the very short duration of a typical burst. Discriminator 222 responds to radiation exceeding that threshold by producing immediately on the line 226 an output pulse. That pulse may be employed for any desired purpose, such as to fuze a warhead before the control system or the vehicle itself is destroyed by the blast. Such fuzing may occur at such high altitude as to cause little or no ground damage. However, it produces at least high altitude blackout effects on the defender's communication and radar systems, which is preferable to losing the weapon entirely.

The signal utilization device indicated schematically at 230 may be of known type and does not require detailed description. If that device involves fuzing of a warhead it is to be understood that it will embody proper fail-safe provisions which may require modification of the present sensing and control system to provide redundancy, for example. Such modification of the present illustrative embodiment can be carried out in accordance with principles well understood in the art.

FIG. 3 represents in schematic form an illustrative modification of the system shown in FIG. 1 that is particularly useful when a relatively accurate signal is desired at a predetermined altitude which is spaced relatively far below the lower of two isopycnic layers, but too high for practical ranging from ground level. Such a signal may be used, for example, as a fuzing signal to produce an air burst at desired altitude, as already described in connection with line 114 of FIG. 1.

In FIG. 3 two atmospheric density detectors are indicated at 70a and 70b. These are typically arranged to produce output signals on the respective lines 102a and 102b in response to input signals from line 52 corresponding to the upper and lower isopycnic layers. Each of those detectors may be similar to detector 70 of FIG. 1. In practice, however, they may be largely integrated. For example, detector 70b may be substantially like 70 of FIG. 1; while detector 70a comprises an output flip-flop corresponding to 100 but receiving its input from an intermediate point of divider chain 90 of detector 70b, that point being selected to provide a signal at the smaller atmospheric density at the upper isopycnic layer.

A calibration timer 240 is arranged to start and stop in response to respective input signals from lines 102a and 102b. Timer 240 records the time interval between those signals in any desired manner, for example by the charge accumulated on a capacitor, or by counting timing pulses from a suitable source such as an oscillator. An output timer, indicated at 242, receives its starting signal via line 243 from one of the detector outputs, shown as 102b. Output timer 242 is adjustable under control of calibration timer 240, as indicated by the line 244. That control is such that timer 242 produces an output signal on the line 114a at the end of an output time interval that varies in any desired manner with the calibration time period recorded by timer 240. For many purposes the output time may be directly proportional to the calibration time, the factor of proportionality being preferably adjustable, as by a control device indicated schematically at 246. That device may, for example, comprise a manual control for adjusting the ratio of the output time to the calibration time and thereby selecting the desired relation between the output signal altitude and the vertical separation of the two isopycnic layers.

In practice, the two timing devices represented separately in FIG. 3 typically utilize a single pulse counter 250 of known type which counts up in response to pulses received on input line 252 and counts down in response to pulses received from a second input line 262 (FIG. 4). An output pulse is developed on the line 114b in response, for example, to return of the counter to its normal zero-count condition. Count-up pulses are developed by an oscillator 253 and are supplied to the counter via the gate 254, which is opened by a signal from line 102a and closed by a signal from line 102b. Count-down pulses are developed by the oscillator 263 and are supplied to the counter via the gate 264, which is initially closed and is opened by a signal from line 102b, for example. The period of oscillator 263 is preferably variable in known manner by control device 246, for the purpose already indicated. It may also be made variable via the line 247 under control of the count standing in counter 250, thereby introducing a desired degree of non-linearity into the relation between the calibration and output time periods. It will be understood that corresponding effects may also be obtained by opposite variation of the pulse rate of oscillator 253.

In operation of the subsystem of FIG. 4, when the input signal on line 52 reaches the average pulse frequency corresponding to the upper isopycnic density, detector 70a produces a signal on line 102a. That signal opens gate 254 and counter 250 starts counting up at a rate set by oscillator 253. When the input signal at 52 corresponds to the lower isopycnic density, the resulting signal on line 102b closes gate 254 and opens gate 264. Counter 250 then counts down at a rate set by oscillator 263. When counter 250 reaches the selected critical count, typically zero, an output signal is delivered to line 114b and may be used for any desired purpose. The vehicle travel time from the lower isopycnic level to the output signal corresponds to the travel time between isopycnic levels multiplied by the ratio of the pulse rate of the oscillator 253 to that of oscillator 263. The variation with altitude of the vertical component of the vehicle velocity is generally known and can be taken into account. Suitable selection of the pulse rate ratio therefore provides an output signal at substantially the desired altitude.

The described type of ranging subsystem, illustratively shown at 140 in FIG. 1 may be employed for other purposes than target detection. It is also useful for navigation purposes, for example for maintaining a low-flying vehicle at a desired distance above the ground. For that purpose, two ranging subsystems such as 140 may be provided, which respond selectively to respective reference ranges that are closely spaced on opposite sides of the desired value. With suitable selection of parameters, an output signal is obtained from both subsystems is obtained when the actual range is midway between those values. If the range is slightly in error in the direction of one of the reference ranges, a signal is obtained only from the subsystem for that reference range. The resulting signals thus provide a suitable servo input for a control system of known type for the elevators of the vehicle.

In FIG. 5 such a navigational control system is represented schematically. The signal on line 52 from detector 40 of FIG. 1, for example, is supplied to the two ranging subsystems 140a and 140b. Their respective outputs on lines 160a and 160b control a differential device 280. That device is shown illustratively as a conventional differential relay with double-throw switch 282. Switch 282 is normally open and is also open when both input lines are energized. When only one input line is energized, switch 282 connects a power source 284 to the appropriate input line 285 or 286 to the elevator control mechanism indicated at 290. The elevator surface 292 of the vehicle is thereby driven in the appropriate direction to restore the vehicle to the desired range above the ground.

Whereas the described use of X-rays as sensing medium has many outstanding advantages for the purposes of the present invention, other types fo penetrating radiation may also be employed. Apparatus is well-known, for example, for producing a pulsed beam of neutrons, which may be utilized in place of the X-ray beam represented at 20 in FIG. 1. Neutrons scattered by matter 42 in the beam may be sensed by a scintillator, as indicated at 46, but utilizing a suitable sensitive material that is responsive to neutrons, such as boron trifluoride, for example.

A source of penetrating electrons may be constructed essentially like X-ray source 12 of FIG. 1, but utilizing an anode of grid type, for example, in place of X-ray target 18. Such an electron source is represented schematically at 12a in FIG. 6. The grounded anode 18a is shown of annular form and is designed in known manner to produce desired focussing of the output electron beam 20a. Negative accelerating voltage is supplied from power supply 14a to the cathode 17a. The modulating voltage is supplied to grid 19a and is referenced to the cathode, as indicated by the line 27b. Suitable window structure for transmitting the electron beam is indicated schematically at 12b.

The present invention is in the nature of an improvement upon the prior invention for which application has been filed on Oct. 8, 1962, Ser. No. 228,908, now Patent No. 3,234,389, jointly by the present applicants and Felix H. Boehm under the title "Ranging System," and assigned to the same assignee as the present application.

We claim:

1. A system for detecting proximity of a vehicle to an object at a predetermined range, comprising in combination
   a source energizable to project from the vehicle a beam of penetrating radiation that is appreciably scattered by the atmosphere,
   means for pulsing the source periodically to emit radiation pulses of duration short compared to the total travel time for radiation to and from said range,
   the period between pulses exceeding that travel time,
   sensing means having an output corresponding to the intensity of radiation reflected back to the vehicle by matter in the path of the beam,
   and means for producing a signal in response to opposite deviations of the sensing means output above and below the values corresponding to normal atmospheric reflection at respective different times following pulse emission, said different times corresponding to backscatter from ranges that substantially equal and exceed, respectively, said predetermined range.

2. A system for detecting proximity of a vehicle to an object, comprising in combination
   a source energizable to project from the vehicle a beam of penetrating radiation that is appreciably scattered by the atmosphere,
   means for pulsing the source periodically to emit radiation pulses of duration short compared to the period between pulses,
   sensing means having an output corresponding to the intensity of radiation reflected back to the vehicle by matter in the path of the beam,
   and means for producing a signal in response to the sensing means output being greater than the value corresponding to normal atmospheric reflection at one selected time following pulse emission and being less than the value corresponding to normal atmospheric reflection at a later selected time following pulse emission.

3. A system for detecting proximity of a vehicle to an object, comprising in combination
   an X-ray tube mounted in the vehicle,
   means for pulsing the tube periodically to emit from the vehicle a pulsed beam of X-rays of pulse duration short compared to the period between pulses,
   sensing means having an output corresponding to the X-ray intensity reflected back to the vehicle by matter in the beam path,
   means for developing a reference signal,
   means for continuously comparing the sensing means output with the reference signal and developing a control signal in response to the reference signal exceeding the sensing means output,
   and output means responsive to existence of said control signal at a predetermined time following pulse emission.

4. A system for detecting proximity of a vehicle to an object, comprising in combination
   an X-ray tube mounted in the vehicle,
   means for pulsing the tube periodically to emit from the vehicle a pulsed beam of X-rays of pulse duration short compared to the period between pulses,
   sensing means having an output corresponding to the X-ray intensity from individual pulses of said beam reflected back to the vehicle by matter in the beam path,
   means for establishing first and second reference levels for the sensing means output,
   means for developing a control signal in response to the sensing means output exceeding the first reference level at a first predetermined time following said pulse emission,
   and means for disabling the control signal in response to the sensing means output exceeding the second reference level at a second predetermined time which follows said first time.

5. A system for detecting proximity of a vehicle to an object, comprising in combination
   an X-ray tube mounted in the vehicle,
   means for pulsing the tube periodically to emit from the vehicle a pulsed beam of X-rays of pulse duration short compared to the period between pulses,
   sensing means having an output corresponding to the X-ray intensity from individual pulses of said beam reflected back to the vehicle by matter in the beam path, means for establishing first and second reference levels for the sensing means output, means for developing a first control signal in response to the sensing means output exceeding the first reference level at a first predetermined time following said pulse emission, means for developing a second control signal in response to the second reference level exceeding the sensing means output at a second predetermined time which follows said first time, and means for developing an output signal in response to said first and second control signals.

6. A system for detecting proximity of a vehicle to an object, comprising in combination a source energizable to project from the vehicle a beam of penetrating radiation that is appreciably scattered by the atmosphere, means for pulsing the source periodically to emit radiation pulses of duration short compared to the period between pulses, sensing means having an output corresponding to the intensity of radiation reflected back to the vehicle by matter in the path of the beam, means for producing first and second timing pulses which follow said radiation pulses by respective first and second delay times, means for establishing first and second reference levels for the sensing means output, means for developing a first control signal in response to the sensing means output exceeding the first reference level at the time of the first timing pulse, means for developing a second control signal in response to the second reference level exceeding the sensing means output at the time of the second timing pulse, means for delaying the first control signal by the difference of said first and second delay times, and means for producing an output signal in response to coincidence of the delayed first control signal and the second control signal.

7. A system for measuring the density of the ambient atmosphere surrounding a supersonic vehicle beyond a selected radius, said system comprising in combination means for radiating discrete pulses penetrating of X-ray radiation from the vehicle into said atmosphere, the duration of each pulse being short compared to the period between pulses, detecting means for developing an electrical signal representing the intensity of said X-ray radiation energy backscattered from the atmosphere, means for disabling the detecting means during a predetermined time following each pulse emission, said time corresponding to the total travel time for radiation to and from points at the selected radius from the vehicle, and means responsive to the resulting electrical signal for developing an output signal that represents the atmospheric density beyond said selected radius.

8. A system for detecting a predetermined density of the ambient atmosphere surrounding a supersonic vehicle, said system comprising in combination means for radiating penetrating radiation of predetermined energy per quantum into said atmosphere, detecting means for developing a pulse in response to each quantum of said energy backscattered from the atmosphere, means for summing said pulses during successive time periods of predetermined length, means for developing a signal each time said pulse sum exceeds a predetermined value during a single time period, and output means responsive only to a plurality of said signals developed during respective time periods.

9. A system as defined in claim 8, and wherein said respective time periods are mutually spaced in time.

10. A system for detecting a predetermined density of the ambient atmosphere surrounding a supersonic vehicle, said system comprising in combination means for radiating penetrating radiation of predetermined energy per quantum into said atmosphere, detecting means for developing a pulse in response to each quantum of said energy backscattered from the atmosphere, resettable means for summing said pulses, means for resetting the pulse summing means at regular time intervals, means for developing a control signal in response to the pulse sum attaining a predetermined value before reset, counting means for summing said control signals, and means for developing an output signal in response to the signal sum attaining a predetermined value.

11. A system as defined in claim 10 and including means for resetting the signal summing means after each time interval in which a control signal is not developed.

12. A system as defined in claim 10 and including means for disabling said pulse summing means following each reset thereof for a time period that is less than the time interval between successive resets.

13. A system for operating a device on a re-entry vehicle and the like, said system comprising in combination means for individually detecting two different isopycnic density values in the ambient atmosphere, settable timing means initiated in action in response to detection of one of said density values, means acting to set the timing means under control of the time of flight between said two density values, and means for operating said device under control of the timing means.

14. A system for operating a device on a re-entry vehicle and the like, said system comprising in combination sensing means for individually detecting two different isopycnic density values in the ambient atmosphere, timing means for developing a timing signal that increases effectively continuously in response to a first control signal and decreases effectively continuously in response to a second control signal, means for supplying the first control signal to the timing means in response to the first isopycnic value, means for supplying the second control signal to the timing means in response to the second isopycnic value, and means for operating said device under control of a predetermined value of the timing signal following said second control signal.

15. A system as defined in claim 14, and including also means for adjustably varying the ratio of the rates at which said timing signal increases and decreases.

16. A system as defined in claim 14, and including also means for varying the rate of change of the timing signal under control of the instant value thereof.

17. A weapon control system for a re-entry vehicle and the like, comprising in combination a source energizable to project from the vehicle a beam of penetrating radiation that is appreciably scattered by the atmosphere, first control means actuable to continuously energize the source, second control means actuable to pulse the source intermittently, sensing means for developing a signal in response to radiation backscattered by matter in the path of the beam, which signal represents the intensity of said backscatter radiation, first discriminating means selectively responsive to the sensing means signal that corresponds to continuous energization of said source in an ambient atmosphere of predetermined reference density, second discriminating means selectively responsive to the sensing means signal that corresponds to pulsed energization of the source in presence of a target at predetermined range, means for actuating the first control means at an altitude above said reference density, means for actuating the second control means under control of the first discriminating means, and means for controlling said weapon under control of said second discriminating means.

18. A weapon control system as defined in claim 17 and wherein said means for actuating the second control means comprises timing means initiated in action by the first discriminating means and means for actuating the second control means under control of the timing means.

19. A weapon control system as defined in claim 17 and wherein said first discriminating means comprises digital counting means responsive to a predetermined rate of signal pulses exceeding a selected threshold energy, and said second discriminating means comprises means responsive to the signal level at a predetermined time following each tube pulse.

20. A weapon control system for a re-entry vehicle and the like, comprising in combination an X-ray tube normally projecting a continuous beam of X-rays from the vehicle into the atmosphere, control means actuatable to pulse the tube intermittently, sensing means for developing a signal responsive to X-rays backscattered by matter in the path of the beam, first discriminating means selectively responsive to the sensing means signal that corresponds to backscatter of said continuous beam from the atmosphere at a predetermined altitude, second discriminating means selectively responsive to the sensing means signal that corresponds to pulsing of the tube in presence of a target at predetermined range, means for actuating the control means and arming the weapon under control of the first discriminating means, and means for fuzing the weapon under control of the second discriminating means.

21. A weapon control system for a re-entry vehicle and the like comprising in combination an X-ray tube energizable to project a beam of X-rays from the vehicle into the atmosphere, control means for pulsing the tube intermittently, sensing means for developing a signal responsive to X-rays backscattered by matter in the path of the beam, said sensing means being responsive also to high energy nuclear radiation, first discriminating means selectively responsive to the sensing means signal that corresponds to backscatter of X-rays from a target at predetermined range, said discriminating means being capable of being disabled by continuous high energy radiation above a predetermined threshold intensity, second discriminating means selectively responsive to the sensing means signal that corresponds to presence of continuous high energy radiation above said threshold intensity, and means for controlling the weapon under independent control of each of said discriminating means.

22. A weapon control system for a re-entry vehicle and the like, comprising in combination an X-ray tube energizable to project a beam of X-rays from the vehicle into the atmosphere, control means for pulsing the tube intermittently, sensing means for developing a signal responsive to X-rays backscattered by matter in the path of the beam, said sensing means being responsive also to high energy nuclear radiation of an intensity capable of disabling the weapon, first discriminating means selectively responsive to the sensing means signal that corresponds to backscatter of X-rays from a target at predetermined range, means for controlling the weapon under control of said discriminating means, second discriminating means selectively responsive to the sensing means signal that corresponds to said in-intensity of high energy radiation capable of disabling the weapon, and means for fuzing the weapon essentially immediately under control of said second discriminating means.

23. A weapon control system for a re-entry vehicle and the like, comprising in combination means for producing a signal that represents proximity of the vehicle to an object as defined in claim 2, and means for fuzing said weapon under control of said signal.

24. A weapon control system for a supersonic vehicle, comprising in combination means for producing an output signal that represents the density of the ambient atmosphere as defined in claim 10, and means for controlling said weapon under control of said output signal.

25. A system for operating a device on a re-entry vehicle and the like, said system comprising in combination a source energizable to project from the vehicle a beam of penetrating radiation that is appreciably scattered by the atmosphere, first control means actuable to continuously energize the source, second control means actuable to pulse the source intermittently, sensing means for developing a signal in response to radiation backscattered by matter in the path of the beam, which signal represents the intensity of said backscattered radiation, first discriminating means selectively responsive to the sensing means signal that corresponds to continuous energization of said source in an ambient atmosphere of predetermined reference density, second discriminating means selectively responsive to the sensing means signal that corresponds to pulsed energization of the source in presence of a radiation scattering object at predetermined range, means for actuating the first control means at an altitude above said reference density, means for actuating the second control means under control of the first discriminating means, and means for controlling said device under control of of the first discriminating means.

26. A system as defined in claim 25 and wherein said predetermined reference density is an isopycnic density for the ambient atmosphere.

27. A weapon control system as defined in claim 21, and wherein the sensing means is responsive to individual quanta of said high energy radiation, the amplitude of the sensing means signal increasing with the energy of said quanta, and said second discriminating means is responsive only to signal amplitudes corresponding to a quantum energy exceeding the maximum quantum energy of said backscattered X-rays.

28. A weapon control system as defined in claim 21, and wherein the sensing means is responsive to individual quanta of said high energy radiation, the amplitude of the sensing means signal increasing with the energy of said quanta, and said second discriminating means comprise means for producing an electrical pulse in response to each sensing means signal corresponding to a quantum energy exceeding a predetermined threshold energy greater than the maximum quantum energy of said backscatter X-rays, means for summing said electrical pulses during seccessive periods of time that are at least about 100 times longer than the duration of the immediate radiation from a nuclear burst, and means responsive to the pulse sum exceeding a predetermined value during a time period.

References Cited

UNITED STATES PATENTS

| | | | |
|---|---|---|---|
| 2,740,294 | 4/1956 | Sanders et al. | 73—178 |
| 2,792,190 | 5/1957 | Seibold | 244—14 |
| 2,845,027 | 7/1958 | Aiken | 102—70.2 X |
| 2,873,679 | 2/1959 | Gibson | 102—70.2 |
| 2,931,300 | 4/1960 | Lord et al. | 102—70.2 |
| 2,943,202 | 6/1960 | Kramer | 250—59 |
| 2,955,777 | 10/1960 | Null et al. | 244—14 |
| 2,956,164 | 10/1960 | Ford | 250—71.5 |
| 2,987,621 | 6/1961 | Mielziner et al. | |
| 3,027,842 | 4/1962 | Hopkins | 102—70.2 |
| 3,058,344 | 10/1962 | Dessler | 73—178 |
| 3,129,424 | 4/1964 | Rabinow | 102—70.2 X |
| 3,133,250 | 5/1964 | Molmud | 244—14 X |
| 3,165,749 | 1/1965 | Cushner | 244—14 |
| 3,198,118 | 8/1965 | Lorenz | 102—70.2 |

FOREIGN PATENTS 345,315   12/1936   Italy.

OTHER REFERENCES

"Principles of Guided Missile Design," Von Nostrand Co., Inc., 1955, UG 630 L6 C.3, page 19.

Beta Backscatter Measures Altitude, Nucleonics, vol. 18, No. 3, March 1960, page 124.

BENJAMIN A. BORCHELT, *Primary Examiner.*

SAMUEL FEINBERG, *Examiner.*

L. L. HALLACHER, W. C. ROCH,
*Assistant Examiners.*